United States Patent Office 3,455,709
Patented July 15, 1969

3,455,709
SELF-CURING INORGANIC ZINC-RICH PAINT
George W. Sears, Jr., Wilmington, Del., assignor to E. I. du Pont de Nemours and Company, Wilmington, Del., a corporation of Delaware
No Drawing. Filed Apr. 2, 1965, Ser. No. 445,257
Int. Cl. C09d 5/10, 1/02
U.S. Cl. 106—84   3 Claims

ABSTRACT OF THE DISCLOSURE

Inorganic coating compositions containing powdered zinc and an aqueous lithium silicate vehicle in which the weight ratio of zinc to vehicle is between 0.9:1 and 5:1 and in which the vehicle contains from 15 to 35 percent by weight of silica as $SiO_2$, essentially no sodium or potassium ions, has an $SiO_2:Li_2O$ mol ratio between 4.5:1 and 25:1 and is prepared from a deionized alkali stabilized colloidal silica aquasol, are particularly effective as self-curing, protective coatings for metal.

DESCRIPTION OF THE INVENTION

This invention relates to self-curing inorganic zinc-rich paints. More particularly it is directed to self-curing inorganic coating compositions comprising aqueous lithium silicate and zinc powder.

Inorganic coating compositions have been prepared from powdered zinc and colloidal silica vehicles before as disclosed in McMahon's U.S. Patents Nos. 3,130,061 issued Apr. 21, 1964, and 3,142,583 issued July 28, 1964. However, as disclosed in the McMahon patent, U.S. No. 3,130,061, the prior art teaches the need for sodium or potassium hydroxide in the colloidal silica sol to stabilize the colloidal silica against gelation. The sodium or potassium hydroxide was considered necessary even after addition of lithium hydroxide.

This need for sodium or potassium hydroxide as a stabilizer is clearly recited in the prior art where colloidal silica sols are discussed. At a pH of about 6.0 colloidal silica sols are least stable and alkali stabilized sols are therefore those whose pH is above 6.0. A pH of 6.0 corresponds to an alkali concentration of about 0.02% calculated as $Na_2O$ of $K_2O$. I have discovered that superior lithium silicate vehicles are prepared from colloidal silica sols having a pH of less than 6.0 and preferably 4.0 or less, and in fact a distinct advantage is gained by essentially completely removing sodium or potassium from the colloidal silica sols. Such vehicles display an enhanced stability over those which are alkali stabilized and the coating compositions prepared from such vehicles have a reduced water sensitivity after drying.

More particularly I have discovered that lithium silicate vehicles with enhanced stability can be prepared from colloidal silica sols from which has been removed essentially all of the sodium or potassium which can be removed by ion exchange. Moreover, dry paint films formed form zinc-rich compositions in which the vehicles are those as described in this invention possess better water resistance and lower water sensitivity than films prepared with prior art vehicles.

The self-curing inorganic coating compositions of this invention comprise aqueous lithium silicate and zinc powder, the aqueous lithium silicate containing from 15% to 35% by weight of silica as $SiO_2$ and having an $SiO_2:Li_2O$ mol ratio of from 4:1 to 25:1. The aqueous lithium silicate vehicle is one which contains essentially no alkali other than lithium, that is to say, there should be present essentially no sodium or potassium which can be removed by ion exchange. The zinc powder should be present in an amount of from about .9 to about 5 parts by weight per part of aqueous lithium silicate, and should have an average particle size of from about 2 to about 15 microns.

While the silica content of the lithium silicate can be lower than 15% and higher than 35%, lower silica content reduces the binding power of the vehicle and higher silica content generally causes stability against gelation to fall off. Similarly, the $SiO_2:Li_2O$ mol ratio can be greater or less than the 25:1 or 4:1 ratio above. However, lower ratios tend to reduce water resistance of dried paint and higher ratios tend to give dried paint less hardness and abrasion resistance.

It is preferred that the lithium silicate vehicles of this invention have an $SiO_2:Li_2O$ mol ratio of between 4.5:1 and 10:1. Such vehicles permit for self-curing paints which exhibit the hardest dry films having highest abrasion resistance. A most preferred $SiO_2:Li_2O$ mol ratio is from 4.5:1 to 5:1. Such mol ratios are conducive to greatest storage stability for the vehicles at elevated temperatures. Another most preferred $SiO_2:Li_2O$ mol ratio is between 7:1 and 8:1 as self-curing paints made from such vehicles exhibit greatest water and corrosion resistance.

It is also preferred that the lithium silicate vehicles of this invention contain between 20% and 25% silica as $SiO_2$. Such a silica concentration renders the self-curing paint compositions made therefrom most adaptable for various uses and most easily applied.

The lithium silicate vehicles of this invention can be prepared by admixture of lithium hydroxide and colloidal silica in proportions such that the $SiO_2:Li_2O$ mol ratio is between 4:1 and 25:1. The admixture can be accomplished in any suitable manner which results in interdispersion of the two components. Any colloidal silica sol is suitable for use with the lithium hydroxide which has had its alkali metals removed by ion exchange and will result in the above-described compositions. Admixture may be accomplished in such art recognized manners as mixing in a blender, pumping the lithium hydroxide and silica sol simultaneously into a mixing T, mixing the two streams in the chamber of a centrifugal pump, stirring the two components as in a tank, or any other suitable manner.

Commercially available silica sols may be used in the compositions of this invention by first deionizing the sols to remove cations and anions. Deionization of silica sols can be accomplished such as in the manner set forth in the Rule patent, U.S. No. 2,577,485. Cation removal should be continued until the pH of the sol is less than 6.0, which indicates removal of sodium or potassium ions to a concentration of about 0.02%. Preferably cation removal will be continued until the pH is less than 4.0 which indicates removal of essentially all the sodium or potassium ions.

Other forms of silica can, of course, be used to prepare the vehicles of this invention. For example, colloidal silica powders such as "Cab-O-Sil," sold by the Cabot Corporation, and reactive silica gels can be used.

The concentration of silica in the colloidal silica sol used to prepare the lithium silicate of this invention can be from about 16 to about 50% silica as $SiO_2$. Preferred compositions are "Ludox" HS or LS, colloidal silica aquasols sold by E. I. du Pont de Nemours and Company. "Ludox" LS which has a very low anion content can be used without first removing the anions by ion exchange.

The lithium hydroxide used can be any commercially available technical grade of lithium hydroxide. It can be used as an aqueous solution of almost any concentration. Preferred practice is to use a concentrated lithium hydroxide solution and thereby avoid excessive water dilution of the lithium silicate vehicle.

After intermixing the lithium hydroxide and the deionized colloidal silica sol the mixture will age at room temperature for from 12 to 100 hours to allow peptization of the gel that forms upon intermixture. Explanation of the gelling that results upon intermixture of lithium hydroxide and a silica sol can be found in Iler's U.S. Patent No. 2,668,149. Peptization of the gel can be accelerated by heating up to a temperature of about 50° C. and can then be achieved in periods of about 3 to 6 hours. Although further acceleration is possible with somewhat higher temperatures, care must be taken to avoid gelling the final product and therefore such temperatures are not recommended.

Zinc dusts suitable for use in this invention are those commercially available dusts which are predominately less than 15 microns in average particle size and preferably those of 2½ to 5 microns average particle size.

The zinc dust will be used in an amount such that from 85 to 96% of the dry film formed when the aqueous coating composition dries is zinc. Preferably at least 90% and most preferably at least 92% of the dried film will be zinc. The amount of zinc dust which will be admixed with the lithium silicate vehicle will range from about .9 to about 5 parts of zinc per part by weight of lithium silicate vehicle. Although larger amounts of zinc can be used with some lithium silicate vehicles practicality requires that the zinc not exceed an amount which will give a paintable composition. Other metal pigments such as aluminum flake can be used in the compositions of this invention in place of zinc.

Finely divided inorganic additives traditionally used in paint compositions can be added with the zinc powder as desired. For example, pigments, extenders and further anti-corrosion agents can be added for such advantages as they impart. Representative of the pigments which can be added are iron oxide, titanium dioxide, carbon black, china clay and others. Representative of extender compounds which can be used are red lead, lead dioxide, zinc oxide, iron oxide and aluminum oxide. Flexibilizing extenders and viscosity agents such as mica, bentonite and other montmorillonite clays and other agents such as graphite can also be added as desired.

The term lithium silicate as used in this invention means the product obtained upon admixture of the lithium hydroxide and the colloidal silica sol and subsequent peptization. This lithium silicate product is probably a mixture of lithium and silicate ions with the silicate ions having polymerized to varying degrees such that the larger species behave like colloidal silica.

A particularly preferred composition of this invention is a self-curing inorganic coating composition comprising an aqueous lithium silicate vehicle essentially free of alkali metal ions which can be removed by ion exchange, having a silica to lithium oxide mol ratio of 4.6, and containing 23% by weight silica, in admixture with a zinc dust having an average particle size of 2.5 to 5 microns in an amount such that the final composition contains 3.6 parts of zinc by weight per part by weight of vehicle.

Another particularly preferred composition of this invention is a self-curing inorganic coating composition comprising an aqueous lithium silicate vehicle essentially freee of sodium or potassium ions which can be removed by ion exchange, having an $SiO_2:Li_2O$ mol ratio of 7.5:1, and containing 23% by weight silica, in admixture with a zinc powder having an average particle size of 2.5 to 5 microns in an amount such that the composition contains 4.3 parts of zinc per part by weight of vehicle.

This invention will be better understood by reference to the following illustrative examples wherein parts and percentages are by weight unless otherwise indicated.

EXAMPLE 1

To 6,420 grams of "Ludox" LS containing 30.2% silica as $SiO_2$ and having an average silica particle size of 15 millimicrons are added 175 milliliters of washed and drained Amberlite IR 120 ion exchange resin in the hydrogen form, and the mixture is stirred for 10 to 15 minutes until the pH reaches 3.1. The sol is then filtered and analyzed and found to contain 29.95% $SiO_2$. It contains no titratable alkali.

One thousand eight hundred fifty-four parts of a 4.96 normal solution of lithium hydroxide, which has a specific gravity of 1.11, is added to 6,219 parts of the deionized silica sol pepared above and the mixture is vigorously shaken until the components are intermixed and the composition is moderately fluid. After standing for thirty-six hours at room temperature the composition is a moderately opalescent fluid sol. This product contains 23.1% $SiO_2$ and has a $SiO_2:Li_2O$ mol ratio of 7.5:1.

To 200 parts of the above vehicle is added 640 parts of a zinc powder which is a Grade 44 zinc sold by the New Jersey Zinc Company. The mixture is stirred until homogeneous and is then spray coated onto both sides of a series of mild steel panels which have been previously sandblasted and solvent degreased. The panels are allowed to air dry at room temperature.

One hour after spraying the panels, one panel is partly immersed in distilled water for a one-hour period after which it is removed and dried. The coating is found to be intact and not chalky either at the air-water interface or below the air-water interface. The remaining panels are allowed to stand for several days at a temperature of 25° C. and 50% relative humidity. They are then tested for abrasion resistance using a Taber Abraser with a CS-17 wheel and a 1,000 gram load. The panels show a 10 milligram weight loss at 100 cycles. The panels are also tested for paint adherence by bending them around a conical mandrel. The paint coating is loosened up to a diameter of less than .3 to .5 inch when bent around the mandrel. The panels are tested for corrosion and water resistance by partial immersion in tap water at 80° C. and in a 3% sodium chloride solution at room temperature. In the hot tap water no attack is observed even at the interface over a nine-day period. The samples in the 3% sodium chloride solution showed a 20–40% attack at the interface over a nine-day period and a coating loss by weight of 5 to 6%.

EXAMPLE 2

Four hundred fifty grams of "Ludox" HS a silica sol containing 30% silica as $SiO_2$ and having an average silica particle size of 15 millimicrons, is deionized by stirring in a beaker with washed and drained Amberlite IR 120 ion exchange resin in the hydrogen form, until the pH of the colloidal silica drops from 9.7 to 2.5. Amberlite IR 45 ion exchange resin in the hydroxide form is then added and stirred until the pH rises to 3.0. All titratable alkali metal ions as well as essentially all anions are removed by this treatment. The sol is analyzed and found to contain 29.7% silica.

One hundred twenty-two parts of a 3.9 normal lithium hydroxide solution is added to 202 parts of the deionized "Ludox" silica sol and the components are thoroughly blended together in a Waring Blendor. The mixture changes from a moderately stiff gel to a semi-fluid white slurry during mixing. After standing for about four days the white slurry changes to a slightly opalescent fluid sol. This product contains 18.5% silica and has a $SiO_2:Li_2O$ mol ratio of 4.6:1.

To 100 parts of the lithium silicate described above is added 437 parts of finely divided zinc dust sold as Grade 44 by the New Jersey Zinc Company. The mixture is thoroughly stirred until homogeneous and is then spray coated onto 4 x 4 inch mild steel plates which have been previously cleaned by sandblasting and solvent degreasing. The coating is applied to a thickness of 3 to 4 mils to each side of all the panels. The coatings as originally applied are glossy when wet and are allowed to air dry. After drying the coatings are smooth, adherent and highly resistant to corrosion in either hot water or 3% sodium chloride in water.

EXAMPLE 3

A lithium silicate vehicle is prepared as in Example 1 by admixing 85.5 millimeters of 3.9 normal lithium hydroxide solution with 201 grams of a 29.8% silica sol which has an average silica particle size of 15 millimicrons and which has been deionized as in Example 1. This vehicle contains 20.4% by weight of silica and has a $SiO_2:Li_2O$ mol ratio of 6:1.

Four hundred thirty-three parts of finely divided zinc dust are mixed with 100 parts of the above vehicle until a homogeneous dispersion is obtained. Upon application to test panels as in Example 1, the coating composition gives similar advantageous results to those obtained in Example 1.

EXAMPLE 4

A lithium silicate vehicle is prepared in the same manner as in Example 1 by admixing 34.2 mils of 3.9 normal lithium hydroxide solution with 201 grams of a 29.8% silica sol which has an average silica particle size of 15 millimicrons and which has been deionized as in Example 1. The lithium silicate vehicle thus obtained contains 25.2% silica and has a 15:1 $SiO_2:Li_2O$ mol ratio.

Four hundred twenty-nine parts of finely divided zinc powder are admixed with 100 parts of the above described vehicle and the mixture is stirred until a uniform composition is obtained. This composition is then applied to steel panels as in Example 2 and allowed to dry to a smooth adherent coating which exhibits excellent corrosion protection.

EXAMPLE 5

One hundred three grams of "Cab-O-Sil" M-7, a powdered colloidal silica having an average particle size of about 15 millimicrons, which is sold by the Cabot Company, is mixed in a blender with 240 grams of water. One hundred forty-one mils of 5.16 normal lithium hydroxide solution is added to the colloidal silica dispersion in the blender. A lithium silicate vehicle is thus obtained which contains 20% silica and has a $SiO_2:Li_2O$ mol ratio of 4.6:1.

Two hundred forty-three parts of finely-divided zinc powder having an average particle size of 3 microns are added to 100 parts of the above-described vehicle and stired until thoroughly intermixed. The coating composition thus prepared is applied to mild steel panels and a smooth, adherent coating is obtained.

EXAMPLE 6

A 7 millimicron particle size silica aquasol is deionized as in Example 2 to obtain a sol containing 20.7% $SiO_2$. One hundred ninety-three grams of the deionized sol is admixed with 66.8 milliliters of 5 normal lithium hydroxide solution as in Example 2 to obtain a lithium silicate solution containing 15% silica as $SiO_2$ and having a 4:1 $SiO_2:Li_2O$ mol ratio.

One hundred parts of finely-divided zinc powder and 100 parts of the above-prepared lithium silicate solution are admixed until homogeneously interdispersed. The resulting composition when applied to mild steel panels as in Example 2 gives similar corrosion protection.

EXAMPLE 7

Nalcoag 1050, a colloidal silica sol sold by the Nalco Chemical Company and containing 50% silica as $SiO_2$ and having an average silica particle size of 25 millimicrons, is deionized as in Example 2 to obtain a sol containing 42.4% silica as $SiO_2$. Two hundred eighty-two grams of the deionized sol is admixed with 106.8 milliliters of a 5 normal lithium hydroxide solution as in Example 2 to obtain a lithium silicate solution containing 30% silica as $SiO_2$ and having a 7.5:1 $SiO_2:Li_2O$ mol ratio.

Three hundred fifty parts of finely-divided zinc powder and 100 parts of the above-prepared lithium silicate solution are admixed until homogeneously interdispersed. The resulting composition when applied to mild steel panels as in Example 2 gives a smooth, adherent coat and similar corrosion protection.

EXAMPLE 8

"Ludox" LS, a 15 millimicron silica sol containing 30% silica as $SiO_2$, is deionized as in Example 1. 435.6 grams of the deionized sol which contains 27.5% silica as $SiO_2$ is admixed with 40 milliliters of a 4 normal lithium hydroxide solution as in Example 1. The resulting lithium silicate vehicle contains 25% silica as $SiO_2$ and has an $SiO_2:Li_2O$ mol ratio of 25:1.

Four hundred and thirty parts of finely divided powdered zinc having an average particle size of 7 microns is admixed with 100 parts of the above lithium silicate vehicle until they are homogeneously interdispersed. The resulting composition is applied to mild steel panels as in Example 1 to give a smooth, adherent coat and good corrosion resistance.

I claim:

1. A self-curing inorganic coating composition consisting essentially of one part by weight of aqueous lithium silicate and from about 0.9 to 5 parts by weight of zinc powder, said aqueous lithium silicate having an $SiO_2:Li_2O$ mol ratio of between 4:1 and 25:1, and containing from 15 to 35 percent by weight of silica as $SiO_2$ and essentially no alkali metal ions selected from the group consisting of sodium and potassium which can be removed by ion exchange, said silica as $SiO_2$ being derived from a deionized alkali stabilized colloidal silica aquasol.

2. A self-curing inorganic coating composition consisting essentially of one part by weight of aqueous lithium silicate and from about 0.9 to 5 parts by weight of zinc powder, said aqueous lithium silicate having an $SiO_2:Li_2O$ mol ratio of between 4.5:1 and 10:1, and containing from 20 to 25 percent by weight of silica as $SiO_2$ and essentially no alkali metal ions selected from the group consisting of sodium and potassium which can be removed by ion exchange, said silica as $SiO_2$ being derived from a deionized alkali stabilized colloidal silica aquasol.

3. A method of making a self-curing inorganic coating composition comprising removing essentially all alkali metal ions from a colloidal silica aquasol having a silica concentration as $SiO_2$ of from 16 to 50% by weight, said ion removal being accomplished by deionizing the sol to a pH of less than 4, admixing the deionized silica sol with a lithium hydroxide solution so that the $SiO_2:Li_2O$ mol ratio of the lithium silicate solution formed is between 4:1 and 25:1, and admixing with the lithium silicate solution from about 0.9 to 5 parts by weight of zinc powder per part by weight of aqueous lithium silicate.

References Cited

UNITED STATES PATENTS

| | | | |
|---|---|---|---|
| 3,130,061 | 4/1964 | McMahon et al. | 106—84 |
| 3,180,747 | 4/1965 | Patton et al. | 106—84 |
| 3,222,197 | 7/1965 | Sibert | 106—84 |

JAMES F. POER, Primary Examiner